(12) United States Patent
Mustacchi et al.

(10) Patent No.: US 7,145,031 B1
(45) Date of Patent: Dec. 5, 2006

(54) PROCESS AND PLANT TO EXTRACT AND CONCENTRATE TANNINS FROM WOOD AND FROM OTHER NATURAL PRODUCTS

(75) Inventors: Carlo Mustacchi, deceased, late of Rome (IT); by Adriana Arcangeli, legal representative, Rome (IT); Giacomo Matturro, Rome (IT); Paolo Danesi, Rome (IT); Andrea Festuccia, Rome (IT)

(73) Assignee: Proras S.r.l, Rome (IT)

( * ) Notice: Subject to any disclaimer, the term of this patent is extended or adjusted under 35 U.S.C. 154(b) by 0 days.

(21) Appl. No.: 09/530,246

(22) PCT Filed: Oct. 27, 1998

(86) PCT No.: PCT/EP98/06804

§ 371 (c)(1),
(2), (4) Date: Apr. 26, 2000

(87) PCT Pub. No.: WO99/21634

PCT Pub. Date: May 6, 1999

(30) Foreign Application Priority Data

Oct. 28, 1997 (IT) .................... RM97A000653

(51) Int. Cl.
*C07C 69/88* (2006.01)
(52) U.S. Cl. .................................................. 560/69
(58) Field of Classification Search .............. 560/69
See application file for complete search history.

(56) References Cited

U.S. PATENT DOCUMENTS

| | | |
|---|---|---|
| 1,859,497 A | 5/1932 | Buss |
| 2,123,212 A | 7/1938 | Scholler et al. |
| 5,232,593 A * | 8/1993 | Pedersen et al. |
| 5,476,591 A | 12/1995 | Green |
| 5,500,124 A * | 3/1996 | Wallisch et al. |
| 5,549,830 A * | 8/1996 | Carver et al. |

FOREIGN PATENT DOCUMENTS

| | | |
|---|---|---|
| AU | 533 791 | 12/1983 |
| FR | 369 763 | 9/1906 |
| FR | 862750 | 3/1941 |
| JP | 58-51880 | * 3/1983 |
| NL | 8 301 375 | 11/1984 |
| WO | WO 97 44407 | 11/1997 |

OTHER PUBLICATIONS

Wu Ling-ling et al, Membranes Separation Science and Technique (1985) 5(2), pp. 48-58.*
Gons Johan, Netherlands Unexamined Patent Application No. 8301375 (1983).*
Chemical Abstracts, vol. 94, No. 24, Jun. 15, 1981.
Database WPI London, GB; AN 96-301063.
Mulder, M.: "Basic Principles of Membrane Technology". 1990 Klumer, Dordrecht.
Database WPI Week 8946 Derwent Publication Ltd. London, GB; AN 89-333069.
Patent Abstracts of Japan vol. 007, No. 139 Jun. 17, 1983 & JP 58-051880.
Bowen W R et al: "Characterisation and Prediction of Separation Performance of Nanofiltrotion Membranes" Journal of Mebranc Science, vol. 112, No. 2, Apr. 17, 1996, pp. 263-274.

* cited by examiner

*Primary Examiner*—Amelia A. Owens
(74) *Attorney, Agent, or Firm*—James V. Costigan; Hedman & Costigan

(57) ABSTRACT

Process and a plant to extract and concentrate tannins from wood and from other solid natural products containing it characterized in that the solid products are subjected to an extraction (1) by percolation with water and/or steam and the thus obtained tannin solution is subjected to nanofiltration (5).

24 Claims, 1 Drawing Sheet

PROCESS AND PLANT TO EXTRACT AND CONCENTRATE TANNINS FROM WOOD AND FROM OTHER NATURAL PRODUCTS

FIELD OF THE INVENTION

The present invention refers to a process and a plant to extract and concentrate tannins from wood and from other solid natural products containing it.

BACKGROUND ART

In the present description the word tannin(s) identifies a class of products, the vegetable tannins, comprising natural products contained in several parts of trees and plants (leaves, fruits, barks, wood and roots). Tannins are a complex of organic compounds and it is difficult to characterise their various components, in any case the tannins to which the present invention refers can be defined as a mixture of polyphenols with molecular weights ranging between 500 and 3000 dalton and can be subdivided into two sub-groups: hydrolyzable tannins and condensed tannins (Kirk-Othmer "Encyclopedia of Chemical Technology" 2nd Ed. vol. 12, 319–324).

Even though the above mentioned tannins can be used as mordant agents for dyes, in the production of inks, in the oenologic and pharmaceutical fields, their primary use is in the tannage industry. In fact the most important feature of tannins is that they combine with collagen and other proteic substances contained in the animal skin, thus transforming it into leather. For such uses it is important that in the tannin extracts, the hydrolyzable tannins be present in very low amounts, preferably as impurities. Therefore the present invention is focused to obtain highly concentrated condensed tannin solutions.

The main sources of such tannins are: chestnut wood, quebracho wood, sumach leaves, wood and bark of some kinds of oaks, myrobalan.

The extraction process of tannins from vegetal products containing them is a traditional method and it is based on extraction with boiling water. The thus obtained solution is concentrated by evaporation. This method is known since the beginning of this century and substantially nothing has been modified, except for the traditional boiling pools, that have been replaced with counter-current extractors, which, in any case, do not allow higher extraction yields, in that the final tannin solution is still scarcely concentrated (about 5% by weight).

According to known techniques, as described in M. Giua "Trattato di Chimica Industriale" UTET, 45–49 (1973), chopped wood is loaded into a battery of autoclaves working in counter-current. In this manner fresh water meets the exhausted wood and the outgoing solution, enriched in tannin, solubilizes the tannin contained in high concentration in the fresh chopped wood incoming the battery of autoclaves. This treatment, called leaching, is carried out generally in water at about 110–120° C. and at a maximum pressure of (0.8 bar) $0.8 10^{-1}$ MPa for about 6 hours, with a water/wood ratio of about 2–2.4 by weight. Generally, through this boiling treatment a tannin solution at 4–5% by weight is obtained, with an extraction yield of about 60–65% (R. Jullien, Durand Ayme "Le tannnage vegetal", Centre technique de cuir Ed., (1980). After clarification by settling, the tannin solution is concentrated in multiple evaporators, under vacuum to limit the tannin oxidation, up to the desired concentration (generally 40–50% by weight).

The thus obtained solution can be added up with known stabilising agents and stored, or it can be further treated, for example it can be powder dried, for example atomised.

The main drawbacks, that make unacceptable the above process, are the following: low extraction yields, too large amounts of water to be used, too high energy consumption to evaporate such water.

Several plants are known to perform the tannin extraction, however their main drawback is that the contact between the extraction fluid and the material to be extracted is unsatisfactory, thus making poor the plant performances.

The use of filtration membranes is known in this field, however the products obtained till now are unsatisfactory, both in terms of quality of the final product and/or in terms of the performances of the membranes.

The present invention solves the above problems.

SUMMARY OF THE INVENTION

It is an object of the present invention to provide a method to extract tannins from vegetal products and to concentrate the thus obtained tannin solution, the extraction being carried out by percolation and the concentration being carried out by nanofiltration with spiral wound membranes.

Another object of the invention is to provide a plant to extract and concentrate the tannin solution, said plant comprising at least an extractor and a nanofiltration stage.

A further object of the invention is the use of nanofiltration spiral wound membranes to concentrate the tannin aqueous solution up to the desired value. Other objects will be evident from the detailed description of the invention.

DETAILED DESCRIPTION OF THE INVENTION

Figure 1:
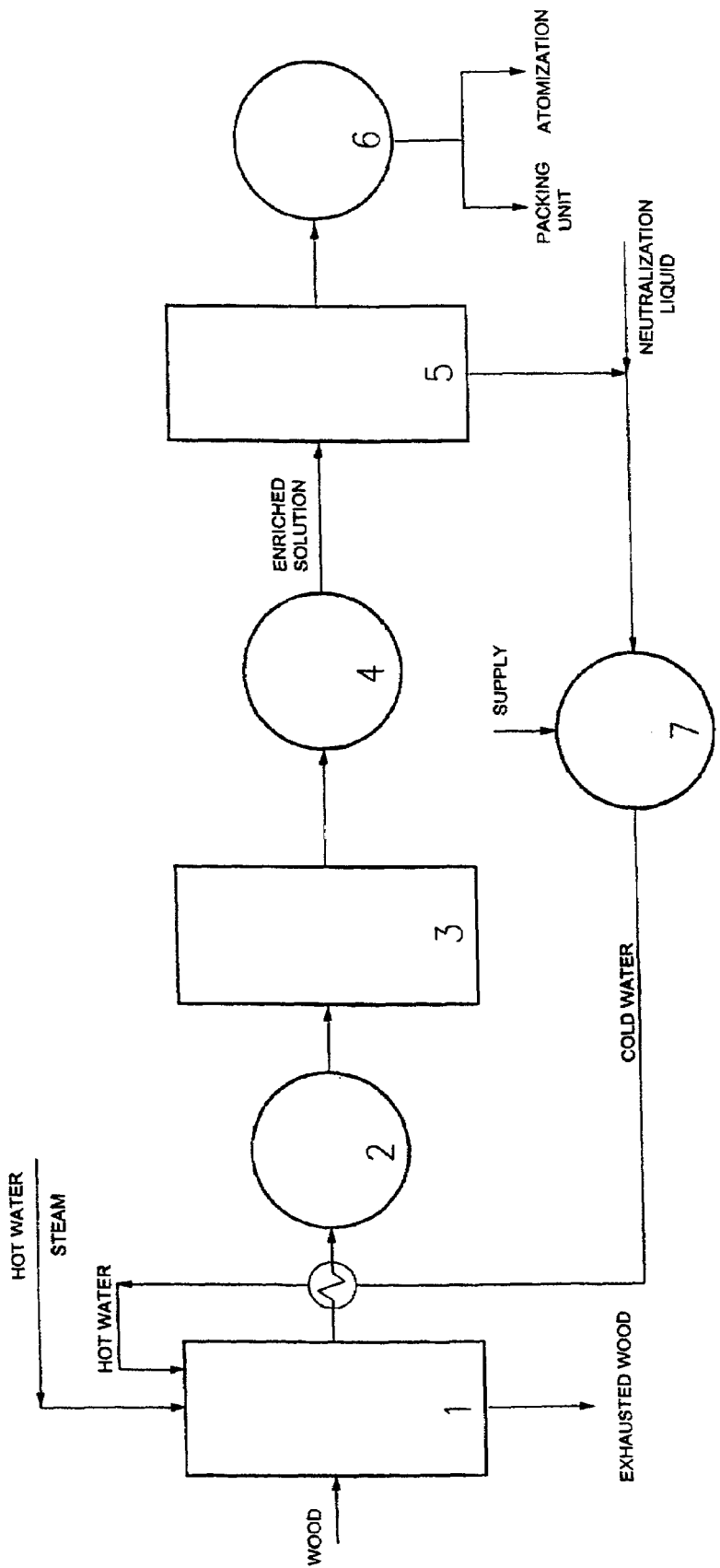
FIG. 1 is a block diagram of a preferred process according to the invention.

In the present description, the word "nanofiltration" is referred to filtration techniques carried out by membranes; the wordings "ultrafiltration" and "reverse osmosis" are here both synonym of the word "nanofiltration". These techniques allow to separate different kinds of molecules present in a solution; they are based both on a mechanical separation and on a chemical-physical separation, the last one relating to the different chemical and physical affinity of the molecules to be separated with respect to the nature of the membranes.

The method described in the present invention is based on the fact that the solid material to be extracted, chopped by traditional techniques, is subjected to an extraction by percolation with water and the thus obtained aqueous solution is nanofiltered with suitably selected membranes, that allow to obtain tannin concentration of 50% by weight in tannin or higher.

It must be stressed that the percolation technique requires plant structures more complex and more expensive than the counter-current ones, however, according to tests performed by the applicants, not only the initial high investment costs turn into a final saving, but also the so obtained product is better than the one obtained in the traditional way, as shown below.

The extraction by percolation according to the invention is carried out by an extraction unit 1, comprising at least an extractor, wherein a water flow, preferably demineralized water, and/or a steam flow, comes in contact with the solid material to be extracted. The water has a temperature ranging between 90° and 115° C. and it is acid (pH=1.5–6) to increase the extraction power; pressure is maintained between (0 and 3 bar) 0 and 3 $10^{-1}$ MPa. Water extracts tannin from the solid material and the resulting solution is collected at the bottom of the extractor. Preferably this extraction stage is carried out in a closed cycle, that is, the tannin solution at the bottom of the extractor is recycled, at least once, preferably, from 6 to 10 times per hour to the top of the extractor or, in case of more than one extractor, to the top of the next extractor.

The extractor is a vessel of variable capacity in accordance with the plant capacity, generally built in stainless steel (AISI 304), cylindrical in shape and with the bottom in the shape of frustum of cone. On top of the extractor there are positioned a charging hopper and a valve to guarantee the seal. A device fit to move the solid bed of material, for example an Archimedean screw, can be positioned inside the extractor. The water and/or the steam for percolation are sent to the solid material in a turbulent manner, in order to increase the extraction yield. To this purpose, at least two ring shaped pipes are positioned on top and inside the extractor, such pipes being provided with sprayers to pour fresh solvent, possibly cooperating with at least another ring of sprayers at the bottom of the extractor. At the bottom it is also positioned an intake that, connected to a circulation pump, allows to send again the water/tannin solution from the bottom to the top of the extractor, in order to increase the power of extraction. On a flange at the bottom of said extractor a valve is positioned to allow the unloading of the exhausted solid, after the extractor is emptied.

In order to further increase the extraction yield, a vibration device can be provided, preferably placed at the bottom of the extractor. An electromechanical vibrator such as a piezoelectric transducer can be used. Such device increase the mutual movement between the material to be extracted and the extraction fluid.

According to a preferred embodiment, the flow of the percolation solvent goes parallel to the main axis of the extractors so that said solvent goes in contact with the solid in water and/or steam jets directed from top to bottom and/or from bottom to top, thus increasing the contact time of the water with the solid. The operative conditions of the extractor 1 are preferably the following: T=90–110° C., pH=4–6, P=(0–1 bar)0–1 $10^{-1}$ MPa, duration of the extraction cycle: 3–4 hours.

The extraction stage, carried out according to the invention, allows to obtain an extraction yield of 90–95%. The tannin solution coming from the extraction unit 1 is sent to the flotation/sedimentation unit 2 that works in a known way. Such unit 2 comprises an atmosphere basin where the solution settles and all the floating parts are eliminated with a skimmer and all the thickened muds at the bottom are eliminated with a scraper. Afterwards the solution is sent to the filtration unit 3, known per se, in order to eliminate the residual deposits. Preferably the filtration is carried out with filters, for example basket filters, leaf-filters or other kind of well-known filters, to stop particles up to 10 μm. After this unit 3, an intermediate storage unit 4 could be provided, from which the solution is drawn to be nanofiltered in the next stage 5.

The nanofiltration is carried out by membranes that, performing a specific mechanical action and having a chemical-physical affinity to tannin, concentrate the entering tannin solution and let the water without tannin to go out. This water is recycled in the plant, after proper treatment, as described below.

The tannin solutions outgoing the membranes are highly concentrated, more than 50% by weight in tannin and can be used as such for tanning operations.

It has been found that the best membranes to be used are the nanofiltration membranes with spiral modules. In fact it has been found that, owing to the complexity of the product to be separated (the polyphenols mixture called tannin), membranes with different configurations do not guarantee adequate performances in terms of life. Also the spacing has been found to be a parameter having influence on the efficiency of the nanofiltration and suitable spacing has been found to be in the range 30–120 mil, preferred range 30–90 mil, particularly preferred range 40–50 mil, "mil" being a measure known to the experts in this field. Preferred operative conditions are: P=(35–40 bar) 3.5–4 MPa, T=50–70° C. Preferred membranes are pressure driven membranes with 200–500 g/mole molecular cut off. The polysulphone membranes and polyamide membranes are particularly preferred.

The concentrated solution outgoing from the membranes is typically about 50% by weight in tannin or higher, with pH=3–3.5, and the permeated water has a pH=5–5.5. The above described nanofiltration process permits to extract more than 95% tannins from the solution.

There can be more than one nanofiltration stages, as the case requires. It is possible to put a plurality of membranes, connected in series. Moreover, to further increase the extraction yields, a vibration device can be provided, in combination with the spiral wound membranes. An electromechanical vibrator such as a piezoelectric transducer can be used, which can be advantageously placed in the housing of the membrane.

The substantially free of tannins water outgoing the membranes is recycled as solvent to the extraction unit 1, being previously subjected to known treatments, such as a neutralisation.

The plant can be supplied with a storage unit 7 for water. The final tannin solution is collected in a storage unit 6 in order to be sent to a packing unit or to other post-treatments, such as drying process (drawer filters, drum filters, atomisation) to obtain tannin powder.

An advantage of the process of the invention comes from the fact that tannin produced in this way, not being subjected to heavy heat-treatments (except the first one in the extraction stage, that in any case is less heavy than the traditional one), is not so degraded (oxidated) as the products obtained with traditional methods; therefore it has higher activity, for example in terms of tannage power, than the corresponding traditional ones. Another advantage is that the tannin solution outgoing the membranes can be directly used for tanning and further concentration steps are not necessary in that tannin solutions having concentrations of about 50% by weight in tannin are suitable for tanning.

Other advantages of the process and the plant described in the invention are found in the economic and ecological fields. The ecological advantages come from the fact that the volumes of wasted water in the innovative plant are 4 times lower than in the traditional ones. Besides, there is no need to evaporate huge quantities of water and the amount of fuel used is enormously lower than the corresponding one used in the traditional technologies. Moreover, by the nanofiltration there are no possibilities for the tannin to be dragged in the atmosphere together with the evaporated water.

The economic advantages are related to the running costs of the plant, that can be cut down to one third of the traditional plant costs, thanks to the low amounts of fuel needed and thanks to the lower investment costs of mechanical concentrators by nanofiltration with respect to the traditional evaporators.

The following examples are intended to illustrate the invention and they should not be considered to limit the invention itself.

EXAMPLE 1

Extraction

The extraction unit comprised three extractors connected in parallel; each extractors of 2000 liters capacity. The load was 350 kg of chopped chestnut wood to each extractors.

Extraction temperature: 110° C.

Pressure: P=(0.8 bar) 0.8 $10^{-1}$ MPa

Number of recycles: 10 per hour

Duration of the extraction cycle: 4 hours water/wood ratio: 1:1 by weight

The outgoing product at the end of the treatment had a tannin concentration of 8% by weight, with an extraction yield of 95%.

EXAMPLE 2

Concentration by Nanofiltration.

To run this test the following membranes, produced by Hoechst Separation Products were used, having the following characteristics:

polyetherosulfonic NF PES10 10H® spiral wound 4"×40", 44 mil polyetherosulfonic N 30 F® spiral wound 4"×40", 44 mil polyamide Desal 5 DK® spiral wound 4"×40", 50 mil The solution coming from the extraction unit, after proper clarification, was subjected to nanofiltration according to the operative conditions listed in Table 1. The results are shown in Table 1, pH of the permeated solution pH=5.5.

TABLE 1

| membrane | temperature °C. | pressure MPa | permeate concentration[a] | permeate flux[b] l/m²h | rejection[c] % |
|---|---|---|---|---|---|
| NF PES10 10H ® | 40 | 3 | 46.7 | 17.5 | 98.6 |
| | 50 | 4 | 53 | 22 | 98.9 |
| N 30 F ® | 40 | 3 | 43.3 | 16.1 | 98.4 |
| | 50 | 4 | 49.7 | 18.3 | 98.6 |
| Desat 5 DK ® | 40 | 3 | 51.1 | 20 | 99.6 |
| | 50 | 4 | 58.7 | 25 | 99.8 |

[a]tannin concentration outgoing the membrane (% b.w.)
[b]unitary flow of tannin solution passing through the membrane
[c]tannin amount extracted from the starting tannin solution Backwashings of the membranes with NaOH-water solutions did not show problems and the membranes were quickly regenerated, with no damages for them. The original fluxes of the modules were reproducible after cleaning procedures.

EXAMPLE 3 (COMPARATIVE EXAMPLE)

The concentration was carried out as described in Example 1, but the spiral wound membranes were replaced by a polyamide tubular membrane AFC99, produced by PCI Membrane Systems Ltd. The average permeation rate (permeate flux) was 5 l/m²h. The concentration of the tannin solution outgoing the membrane was 18.3% b.w.

The further backwashing of the membrane became soon difficult and after a six weeks operative life, the membrane was no more usable.

From Examples 2 and 3 it is evident that only spiral wound membranes can be suitable for the tannins extraction. Different membranes give final solutions characterised by low tannin amounts, moreover the permeate flux is unsatisfactory.

Inside the group of the spiral wound membranes the experts in this field will find the best operative conditions. Applicant has found that Desal 5 DK® 50 mil had the best performances.

Tanning tests, performed by using the tannin solutions obtained according to Example 2 and corresponding commercial products, show much better results for the tannins of the invention in terms of tanning yield and touch of the leather.

The invention claimed is:

1. Process to extract and concentrate tannin from solid natural products containing it, said process comprising the steps of subjecting the solid products to an extraction by percolation with water and/or steam as solvent and concentrating the thus obtained tannin solution by nanofiltration with spiral wound membranes, said membranes being selected among the polyetherosulfonic or polyamidic ones.

2. Process according to claim 1 wherein the membranes have spiral wound modules with spacing in the range 30–120 mil.

3. Process according to claim 1 wherein the membranes have spiral wound modules with spacing in the range 30–90 mil.

4. Process according to claim 1 wherein the membranes have spiral wound modules with spacing in the range 40–50 mil.

5. Process according to claim 1 wherein the extraction is carried out with water at temperature 90°–115° and at pressure P=0–0.3 MPa, the pH of water being between 1.5 and 6 and an efficaceous mutual movement between the solid and the solvent being provided by means that mechanically move the solid and means that circulate the solvent during the extraction.

6. Process according to claim 1 wherein the extraction is carried out in a closed cycle with at least one extractor, the tannin solution being collected at the bottom of the extractor and being recycled, at least once, to the top of the extractor or, in case of more than one extractor, to the top of the next extractor.

7. Process according to claim 6 wherein the tannin solution is recycled from 6 to 10 times per hour.

8. Process according to claim 1 wherein the percolation solvent flows parallel to the main axis of the extractor, going in contact with the solid material with water and/or steam jets directed from top to bottom and/or from bottom to top of the extractor.

9. Process, according to claim 1 wherein the length of the extraction cycle is 3–4 hours.

10. Process according to claim 1 wherein the solvent is sent to the solid product in a turbulent manner by means of sprayers and circulation pumps.

11. Process according to claim 1 wherein the extraction is followed by a further flotation/sedimentation stage through which the solution coming from the extraction settles and all floating parts therein contained are eliminated with a skimmer and all thickened muds at the bottom of it are eliminated with a scraper, said flotation/sedimentation stage being followed by a filtration stage to stop particles up to 10 μm thus obtained, the tannin solution being nanofiltered at least once.

12. Process according to claim 11 wherein the filtration is carried out by basket and/or leaf filters.

13. Process according to claim 1 wherein the nanofiltration is carried out at P=3.5–4.0 MPa and T=50–70° C.

14. Process according to claim 1 wherein the water outgoing the nanofiltration step is recycled as solvent to the extraction unit.

15. Plant to extract and concentrate tannin from natural solid products containing it, characterised by comprising an extraction unit (1) in which the solid material is subjected to an extraction by percolation with water and/or steam as solvent and a nanofiltration unit operating with spiral wound membranes, said membranes being selected among the polyetherosulfonic or polyamidic ones.

16. Plant according to claim 15 wherein the nanofiltration unit comprises at least one spiral wound membrane with 30–120 mil spacing.

17. Plant according to claim 15 wherein the extractor is a cylindrical vessel with the bottom in the shape of frustum of cone, on top of said extractor being positioned a charging hopper and a valve; inside the extractor being positioned at least a device to move the solid; the water and/or the steam for percolation are sent to the solid material in a turbulent manner by a device provided with sprayers at said bottom an intake being further positioned that, connected to a circulation pump, allows to send the water/tannin solution from the bottom to the top of the same extractor or to the next one and a valve allowing to unload the exhausted solid when the extractor is emptied.

18. Plant according to claim 15 wherein the extractor further comprises a vibration device.

19. Plant according to claims 18 wherein the vibration device is a piezoelectric transducer.

20. Plant according to claim 15 further comprising, in relation of co-operation: a flotation/sedimentation unit and a filtration unit from which the tannin solution is drawn to be sent to the nanofiltration unit.

21. Plant according to claim 20 in which the filtration unit comprises basket and/or leaf filters.

22. Process according to claim 11 further comprising an intermediate storage between the flotation/sedimentation stage and the filtration stage.

23. Plant according to claim 17 wherein the bottom of the extractor is further provided with an additional spraying device.

24. Plant according to claim 20 further comprising an intermediate storage unit after the filtration unit from which the tannin solution is drawn to be sent to the nanofiltration unit.

* * * * *